Oct. 6, 1959     A. N. PARKER     2,907,484
BOAT TRAILER
Filed March 25, 1957            2 Sheets-Sheet 1
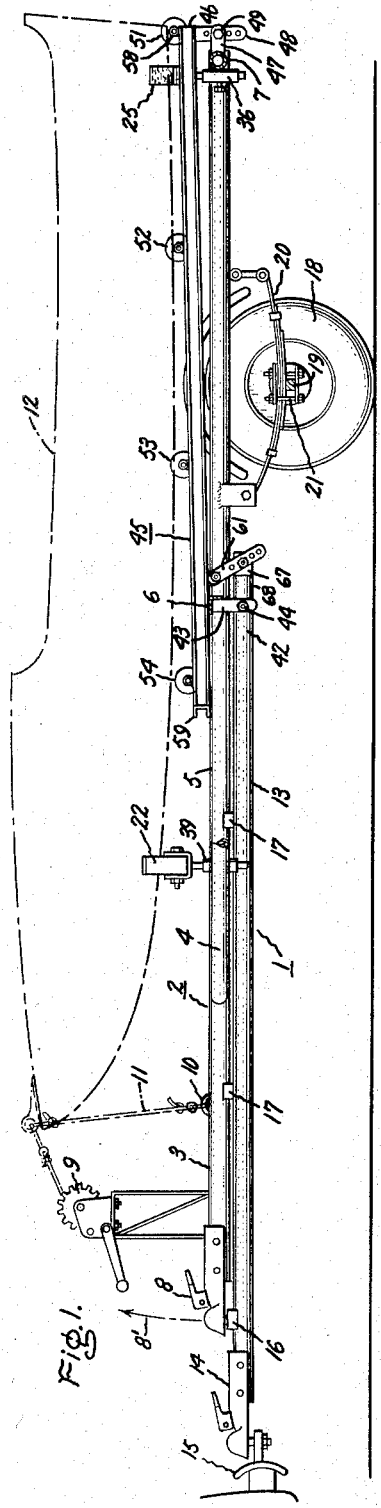
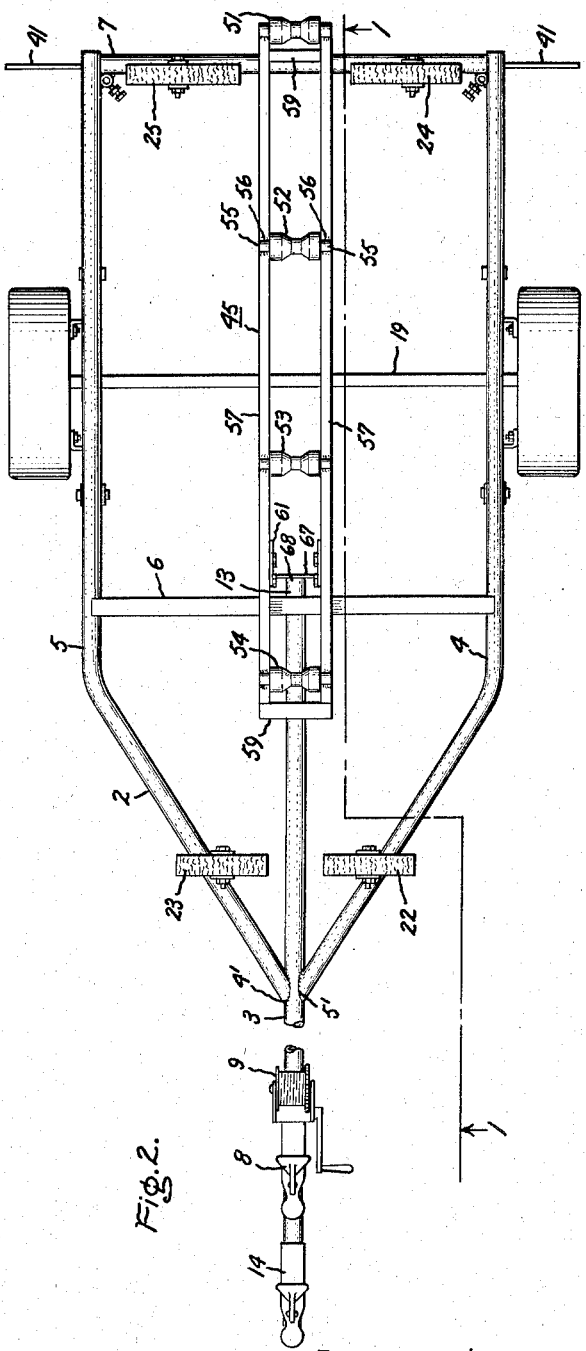
Inventor:
Alton N. Parker,
by George H. Baldwin
His Attorney.

Oct. 6, 1959
A. N. PARKER
2,907,484
BOAT TRAILER
Filed March 25, 1957
2 Sheets-Sheet 2
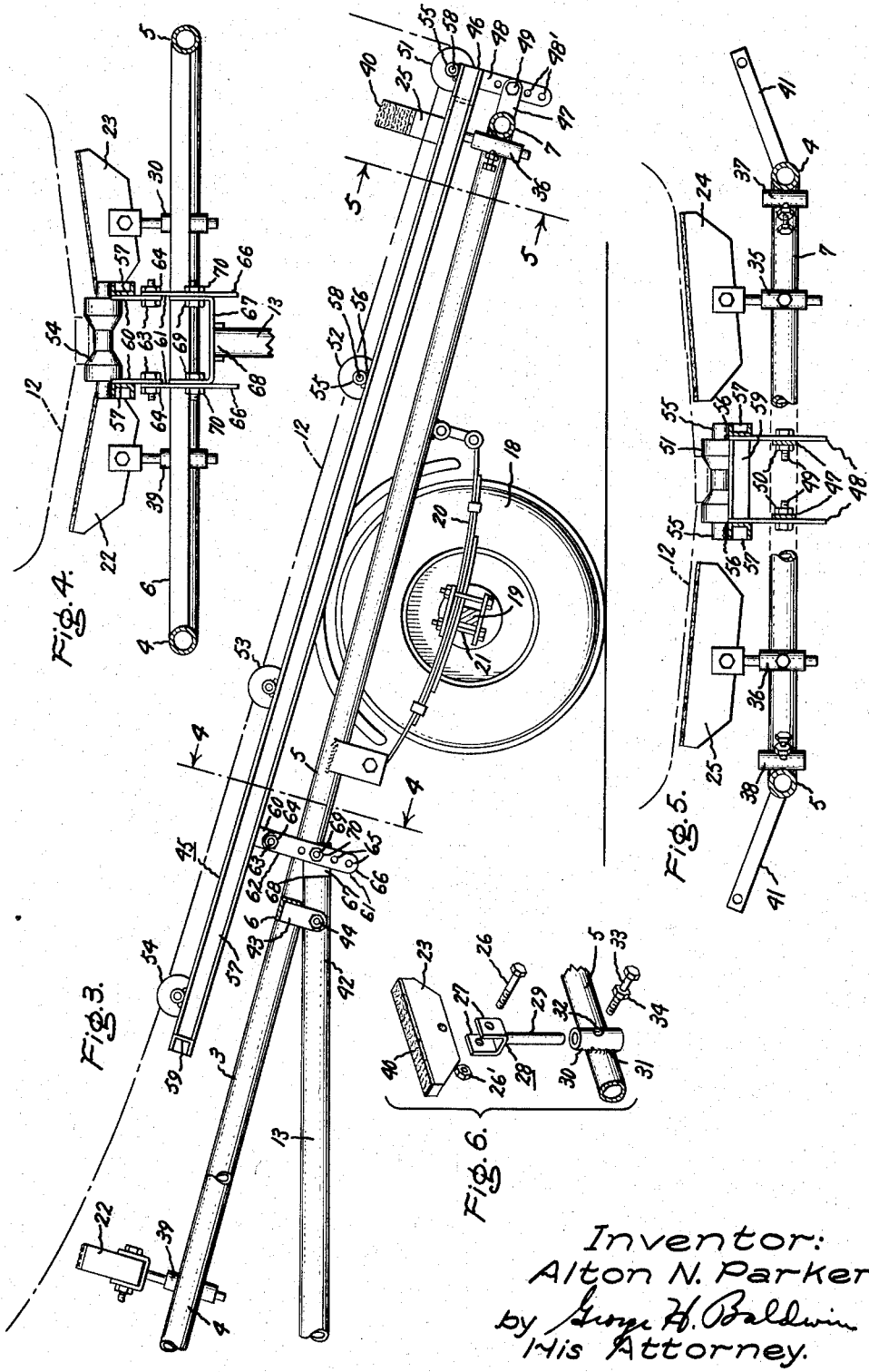
Inventor:
Alton N. Parker,
by George H. Baldwin
His Attorney.

United States Patent Office 2,907,484
Patented Oct. 6, 1959

2,907,484

BOAT TRAILER

Alton N. Parker, Jacksonville, Fla.

Application March 25, 1957, Serial No. 648,418

11 Claims. (Cl. 214—506)

This invention relates to boat trailers, and particularly to trailers incorporating improved launching and loading arrangements.

A general object of the invention is to provide an improved boat trailer, of simple, rugged and inexpensive construction; and more particular objects are to provide a tiltable boat trailer wherein loading and unloading of small boats therefrom by one person directly to and from the water is facilitated; wherein the wheels of the trailer may remain on dry land and attached to the towing vehicle during the loading or unloading operation; wherein adequate support and stability for the boat are provided at all times, both during travel on the trailer and during launching from and loading on the trailer.

Further objects of the invention are to provide a boat trailer wherein only simple adjustment is required to accommodate boats of varying hull contours; and wherein the mechanism brought into play to facilitate launching and loading includes operating mechanism with sufficient mechanical advantage that no great strength is needed by the operator.

This invention particularly pertains to a trailer comprising selectively raisable keel roller means, operable, when it is desired to load or launch the boat, to raise the boat slightly from the stationary blocks or cradles of the trailer. According to the invention, a movable frame carrying a plurality of keel rollers is provided, the frame being arranged automatically to transfer the weight of the boat to keel rollers when a portion of the trailer frame is tilted into a loading and launching position, the keel rollers engaging supportingly along a large portion of the boat keel in a manner to avoid straining of the boat structure.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 1 is a sectional side elevation taken along line 1—1 of Fig. 2 of a boat trailer embodying the invention;

Fig. 2 is a plan view of the trailer;

Fig. 3 is a sectional side elevation of a portion of the trailer shown in launching position, on an enlarged scale, and taken generally along line 1—1 of Fig. 2;

Fig. 4 is a sectional view taken along line 4—4 of Fig. 3;

Fig. 5 is a sectional view taken along line 5—5 of Fig. 3; and

Fig. 6 is exploded view in perspective of one of the boat supporting cradles and its mounting.

Referring now to the drawings, Fig. 1 and Fig. 2 show a boat trailer 1, of which the main longitudinal tilt frame 2 is made up of a forwardly projecting tongue 3 and like opposite longitudinal side frame members 4 and 5 rigidly affixed thereto at respective welds 5' and 4'. Rigidity is afforded by a forward transverse cross member 6 and a rear cross member 7 which connect between frame members 4 and 5. Cross member 6 is preferably an angle iron affixed intermediately to the rear end of tongue 3. The female portion of a releasable attachment device, such as coupling element 8, constitutes the front end of tongue 3, and tongue 3 further carries a winch 9 and a closed hook or eye 10 which serves as a tie for a line 11 from the boat 12, shown in broken lines.

Stationary tongue member 13 underlies and extends both forwardly and rearwardly of tongue 3. A trailer hitch 14 constitutes the front end of tongue member 13 through which the trailer is coupled to a towing vehicle bumper 15. Tongue member 13 is provided with an upstanding male coupling member 16 adapted to be releasably engaged by coupling element 8. Spaced rests or saddles 17 supportingly cradle tongue 3 on tongue member 13 when the trailer is in the travel position shown in Fig. 1.

The running gear of the trailer comprises road wheels 18 journaled on either end of a non-rotatable axle 19 suspending tilt frame 2 through respective laminated leaf springs 20 affixed to the axle by respective clamps 21.

As best seen in Fig. 2 and Fig. 4, frame members 4 and 5 each carry respective self-adjusting rockable bow chocks or boat cradles 22 and 23 disposed forwardly of cross member 6, and, as shown in Figs. 2 and 5, rear cross member 7 supports stern cradles 24 and 25 of similar construction. Fig. 6 shows, in exploded view, the mounting arrangement for cradle 23, which may be duplicated for each of cradles 22, 24 and 25. Cradle 23 is pivotally supported between its ends by a horizontal pivot bolt 26 extending between the upstanding prongs 27 of a fork member 28 and secured by nut 26'. Fork member 28 has a cylindrical rod or stem 29 which fittingly engages a hollow sleeve 30 welded at 31 to the frame member 5. Sleeve 30 is provided with a threaded lateral opening 32 which receives a set screw 33, having a jamb nut 34 which together provide means to secure the stem in the sleeve in a position selected to maintain the cradle 23 at the desired height and extending in the desired direction. Referring now to Fig. 5, sleeves 35 and 36 are provided on rear cross member 7, which, together with an extra pair of sleeves 37 and 38, located at the respective intersections of the opposite ends of rear cross member 7 with frame members 4 and 5, permit alternate locations for stern cradles 24 and 25 on either of two selected positions of separation thereby accommodating boats of varying lengths and stern dimensions. Sleeve 39 is connected to member 4 to support bow cradle 22. In each instance, the sleeve 35, 36, 37, 38 or 39 corresponds to sleeve 30 shown in Fig. 6 as to its construction and cradle support function. Rocking of each boat cradle on its horizontal pivot, such as provided by bolt 26 for cradle 23, allows the boat cradles automatically to adjust to the contour of the boat hull. The cradles may be provided with suitable padding material such as shown at 40 on cradle 23 to prevent them from damaging the hull of the boat. Respective sidewardly extending arms 41 are affixed to frame 2 to permit strapping or other securing of the stern of the boat in travel position.

To permit tilting of tilt frame 2, the rear portion 42 of tongue member 13 is pivotally connected to a pair of rigid straps 43 by pivot bolt or pin 44, the straps being fixed with respect to tongue 3 and cross member 6, preferably being attached at their intersection and extending downwardly therefrom.

An elongated rectangular subframe or keel roller frame assembly 45 overlies the longitudinal axis of tilt frame 2, extending slightly rearwardly of rear cross member 7 and forwardly of pivot pin 44.

The extreme rear end 46 of assembly 45 is pivotally connected by pivot bolts 49 to crossmember 7 of the tilt frame to permit the assembly to swing upwardly about its pivot connection 49 as hereinafter described. The pivotal connection includes a pair of rearwardly extending ears 47 mounted on crossmember 7, and a pair of downwardly extending tabs 48 affixed to rear end 46 of the assembly, the tabs being provided with adjustment openings 48'. A pair of bolts 49, secured by nuts 50, pivotally join the ears to the tabs, completing the pivotal connection. The keel roller frame assembly carries a plurality of rollers such as stern roller 51, intermediate rollers 52 and 53 and front roller 54. The rollers are rotatably mounted in spaced relation by a plurality of bushings 55, each of which is welded, as at 56, to a respective oppositely disposed longitudinal member 57 of the keel roller frame at respective correspondingly opposite points. Each correspondingly opposite pair of bushings 55 rotatably retains a respective cylindrical end of a shaft 58 upon which a roller is mounted. The rollers are preferably shaped to conform to the keel of a boat and may be of hard rubber or the like, soft enough to avoid damaging the keel but hard enough to provide adequate support. Keel roller frame assembly 45 is here shown as constructed of longitudinal channel bar members 57 connected and braced by shorter transverse channel bar members 59.

The pivotal link connection between the assembly and tongue member 3 is best seen in Figs. 3 and 4, wherein a pair of downwardly extending lugs 60 are rigidly attached to respective longitudinal members 57 of the assembly rearwardly of front roller 54 and extend downwardly therefrom. A pair of links 61 are pivotally connected at their upper ends 62 respectively to the downwardly extending lugs 60 by bolts 63 secured by nuts 64, the links being provided with a plurality of adjustment openings 65 in their respective lower end portions 66. Bracket member 67, being rigidly attached to the extreme rear end 68 of tongue member 13, is pivotally connected through one pair of openings 65 with lower end portions 66 of links 61 by bolts 69 secured by nuts 70, thereby completing a pivotal link coupling between tongue member 13 and keel roller frame assembly 45. When tongue 3 is pivoted upwardly from tongue member 13 about pivot pin 44, the pivotal link coupling is effective to swing roller assembly 45 upwardly about its rear pivot 49.

In operation, with tongue member 13 attached to towing vehicle bumper 15 and a boat 12 resting on the trailer, as shown in Fig. 1, the trailer is backed adjacent the water. To launch the boat directly into the water, coupling element 8 is disengaged from coupling member 16 and tongue 3 is raised in the direction indicated by arrow 8' in Fig. 1 to the tilted launching position shown in Fig. 3. As the front end of tongue 3 is elevated, tilt frame 2 tilts backwardly about axle 19. At the same time, lower tongue member 13 pivots about pivot pin 44 with respect to frame 2 in a direction to raise its rear end 68 with respect to frame 2. Since rear end 68 of tongue member 13 is raised, it raises keel roller frame assembly 45 with respect to frame 2 and with respect to the boat cradles. In raising, assembly 45 pivots upwardly about its pivot connection 49.

This aforementioned action tilts the boat supporting tilt frame and roller assembly backwardly and the elevation and tilt of the keel roller frame assembly exceeds the elevation and tilt of the tilt frame, thereby raising the boat from boat cradles 23, 24, 25 and 26 and shifting entirely or substantially entirely the weight of the boat to the keel rollers and the boat is free to roll easily on the rollers into the water.

It is important to note that initial adjustment of the boat cradles should be made with the boat in travel position, as shown in Fig. 1. The stern cradles should be adjusted to carry the weight of the boat aft with the stern roller lightly engaging the keel of the boat. The bow cradles should then be adjusted to raise the bow of the boat slightly so that the remaining rollers do not bear any appreciable or substantial portion of the weight of the boat. The boat is accordingly properly supported at least substantially entirely on the boat cradles for travel and storage, and no further adjustment is needed for the keel rollers to properly engage the keel of the boat when the tongue 3 is elevated. Alternatively, the adjustment may be accomplished with the cradles at fixed heights by selecting appropriate bolt openings 65 and 48' of roller frame assembly links or tabs 61 and 48.

It is also important to note that the front keel roller is positioned forward of the center of gravity of the boat when the boat is loaded on the trailer in travel position, the center of gravity of the boat being, ordinarily and preferably, somewhat forward of axle 19 to impose some downward force of the hitch 14 on the bumper 15. Also important is the length of the keel roller frame assembly relative to the length of the boat, the assembly being preferably more than half the length of the boat and extending fore and aft of the center of gravity of the boat thereby minimizing fore and aft tipping of the boat, as well as minimizing strain on the boat, during launching and loading.

To load the boat onto the trailer directly from the water, the trailer is positioned as for launching with frame 2 tilted and with keel roller frame assembly 45 pivotally raised with respect to frame 2. The winch cable is attached to the bow of the boat, still in the water, and the bow of the boat is drawn onto the stern keel roller 51 and, through proper handling, is guided over the remaining rollers. The winch is located along the longitudinal center of the trailer, as are all the keel rollers, thus the pull from the winch tends to maintain the boat on the rollers. As previously noted, the keel rollers are preferably shaped to conform to the keel of the boat to aid in maintaining the boat in proper alignment during both launching and loading.

After the boat has been drawn into travel position, tongue 3 and tilt frame 2 are lowered into the position of Fig. 1 thereby lowering the keel roller frame assembly 45 and causing, first, the front cradles 22 and 23 to contact the fore portions of the boat hull and support it, and, as lowering continues, the rear cradles finally engage and support the boat hull aft. As previously noted, the cradles have already been adjusted relative to the rollers so that substantially the whole weight of the boat is carried by the cradles when the boat is in travel position, although some or all of the keel rollers may still lightly contact the keel of the boat. Finally tongue 3 is lowered until it rests on top of and along tongue member 13, being cradled thereon in saddles 17. Coupling element 8 is then securely engaged to coupling member 16 locking the tilt frame to the tongue member 13 and, after the bow line 11 is secured to eye 10 and the stern of the boat secured to arms 41, the boat and trailer are ready for transit.

While only a certain preferred embodiment of this invention has been shown and described by way of illustration, many modifications will occur to those skilled in the art and it is, therefore, desired that it be understood that it is intended in the appended claims to cover all such modifications as fall within the true spirt and scope of this invention.

What is claimed as new and what it is desired to secure by Letters Patent of the United States is:

1. In a boat trailer, the combination of a longitudinal tongue member having a forward end portion and a rearward portion, a main longitudinal frame having a front portion and a rear portion, said front portion overlapping the rearward portion of said tongue member, a pivot having an axis extending laterally of said frame and tongue member, said pivot interconnecting said rearward portion of said tongue member to an intermediate portion of said frame, bumper attachment means on said forward end portion of said tongue member, releasable attachment means disposed forwardly of said pivot releasably interconnecting said frame to said tongue member, rotatable road wheels disposed on opposite sides of and suspendingly attached to said frame, said frame extending forwardly and rearwardly of the rotational axis of said wheels, an elongated keel roller frame having a rear portion pivotally connected to said main frame and having a front portion, a plurality of spaced keel rollers mounted on said roller frame, and a link pivotally interconnecting said front portion of said roller frame to a point of said tongue member spaced rearwardly from said pivot.

2. The combination according to claim 1 wherein stern cradles are supportedly connected to said main frame forwardly of said pivotal connection of the rear portion of said keel roller frame.

3. The combination according to claim 1 wherein an upstanding support is connected to said main frame, said support having a pivotal attachment disposed forwardly of said pivotal connection between said keel roller frame and said frame, and a cradle attached by said pivotal attachment to said support and rockable about a horizontal pivot axis with respect thereto.

4. In a boat trailer, the combination of an upper body frame including a plurality of rigid frame members and a forwardly extending upper tongue, a lower tongue member having a forward portion underlying said upper tongue and a rearward portion underlying one of said body frame members, first pivot means pivotally connecting said one body frame member with said lower tongue member, ground wheels disposed at opposite sides of and suspending said body frame, an elongated roller frame member disposed longitudinally of said body frame and having a rear portion disposed rearwardly of said wheels and a front portion disposed forwardly of said wheels, a plurality of rollers mounted transversely on said roller frame member, second pivot means pivotally connecting said rear portion of said roller frame member with a second one of said body frame members adjacent the rearward end of said body frame, and third pivot means connecting said front portion of said roller frame member with said lower tongue member, one of said pivot means comprising a link having respective pivotal connection with each of the members connected by such pivot means.

5. In a boat trailer, the combination of an elongated main frame, a tongue member underlying said frame and having a forward end portion and a rearward portion, a pivot having an axis extending laterally of said tongue member and frame and interconnecting said rearward portion of the tongue member to an intermediate portion of said frame, bumper attachment means on said forward end portion of said tongue member, releasable attachment means disposed forwardly of said pivot releasably joining said frame to said tongue member, road wheels disposed on opposite sides of and suspendingly attached to said frame, said road wheels having a common rotational axis, said frame extending forwardly and rearwardly of said rotational axis, an elongated keel roller frame having a rear portion extending rearwardly of said rotational axis and a front portion extending forwardly of said rotational axis, a plurality of spaced rollers mounted on said keel roller frame, said rear portion of said keel roller frame being pivotally connected to said main frame, and a link having one end pivotally connected to said front portion of said roller frame and having its other end pivotally connected to a point of said tongue member spaced rearwardly from said axis of said tongue member and frame connecting pivot.

6. A boat trailer comprising an elongated main frame suspended on a pair of road wheels having a common axis extending laterally of said frame, said frame being tiltable about said axis, an elongated member having a bumper attachment at its front end and having a rear end portion underlying said frame, a pivotal coupling between said frame and said rear end portion of said member, said member having an extreme rear end spaced rearwardly of said pivotal coupling, an elongated sub-frame having a rearward portion and lying along said main frame, said sub-frame extending forwardly from said rearward portion thereof and having a forward portion, a link joining said forward portion to said member at said extreme rear end thereof, keel rollers on said sub-frame, and a pivotal connection between said rearward portion of said sub-frame and said main frame.

7. In a boat trailer, the combination of an elongated frame adapted and arranged to support a boat restingly thereon, a tongue member underlying said frame and having a forward end portion and a rearward portion, a pivot having an axis extending laterally of said tongue member and frame and interconnecting said rearward portion of the tongue member to an intermediate portion of said frame, bumper attachment means on said forward end portion of said tongue member, releasable attachment means disposed forwardly of said pivot releasably joining said frame to said tongue member, road wheels disposed on opposite sides of and suspendingly attached to said frame, said road wheels having a common rotational axis, said frame extending forwardly and rearwardly of said rotational axis, a keel roller disposed above said rearward portion of said tongue member and generally intermediate the ends and sides of said frame and engageable with the keel of a boat supported on said frame, and means supportingly connecting said roller to a portion of said tongue member spaced rearwardly from said pivot axis.

8. A boat trailer comprising an elongated frame suspended on a pair of road wheels having a common axis extending laterally of said frame, said frame being adapted and arranged to support a boat restingly thereon and said frame being tiltable about said axis, an elongated member having a bumper attachment at its front end and having a rear end portion underlying said frame, a pivot connection between said frame and said rear end portion of said member, said member having an extreme rear end spaced rearwardly of said pivotal coupling, a keel roller disposed above said member and generally intermediate the ends and sides of said frame and engageable with the keel of a boat supported on said frame, mounting means for said roller, and means supportingly connecting said mounting means to said extreme rear end of said elongated member whereby said roller is raised and lowered with respect to said frame in response to pivoting of said elongated member on said pivot connection.

9. In a boat trailer comprising an elongated main frame having respective fore and aft boat supporting cradles mounted spacedly thereon and road wheels supportingly attached to said frame having a common rotational axis located between said fore and aft cradles, said frame comprising an integral forwardly extending tongue portion having a forward end, an auxiliary tongue member underlying said frame and including a forward portion extending along and underlying said frame tongue portion, said auxiliary tongue member terminating forwardly of said frame tongue portion and having draft attachment means affixed to its forward end, releasable means joining said forward portion of said auxiliary tongue to said tongue member portion, said auxiliary tongue member having a rearward end portion underlying said frame, pivot means having an axis parallel to said road wheel axis pivotally connecting said rearward end portion of said auxiliary tongue member to said frame whereby, upon release of said releasable joining means and backward tilting of said frame on said road wheel axis, said forward portion of said auxiliary tongue member swings downwardly from said frame tongue portion, a keel roller disposed between said respective fore and aft cradles, and link means connecting between said roller and said auxiliary tongue member and being connected at a point of said auxiliary tongue member spaced longitudinally along said tongue member from said pivot means for raising said roller with respect to said frame in response to said backward tilting of said frame and downward swinging of said forward portion of said auxiliary tongue member.

10. In a boat trailer comprising an elongated main frame having respective fore and aft boat supporting cradles mounted spacedly thereon and road wheels supportingly attached to said frame having a common rotational axis located between said fore and aft cradles, said frame comprising an integral forwardly extending tongue portion having a forward end, an auxiliary tongue member underlying said frame and including a forward portion extending along and underlying said frame tongue portion, said auxiliary tongue member terminating forwardly of said frame tongue portion and having draft attachment means affixed to its forward end, releasable means joining said forward portion of said auxiliary tongue to said tongue member portion, said auxiliary tongue member having a rearward end portion underlying said frame, pivot means having an axis parallel to said road wheel axis pivotally connecting said rearward end portion of said auxiliary tongue member to said frame whereby, upon release of said releasable joining means and backward tilting of said frame on said road wheel axis, said forward portion of said auxiliary tongue member swings downwardly from said frame tongue portion, a keel roller disposed between said respective fore and aft cradles, and link means connecting between said roller and said auxiliary tongue member and being connected at a point of said auxiliary tongue member spaced therealong longitudinally along said tongue member from said pivot means for raising said roller with respect to said frame in response to said backward tilting of said frame and downward swinging of said forward portion of said auxiliary tongue member, said link means comprising an arm having a portion pivotally connected to said main frame, said arm carrying said roller thereon spacedly from said portion thereof and a link element joined to said auxiliary tongue member at said point and joined to said arm spacedly from said portion thereof.

11. In a boat trailer having a longitudinally extending frame with bow and stern boat supporting cradles mounted thereon and road wheels having a common axis located between said cradles supportingly attached to said frame, a keel roller carried by said frame and disposed rearwardly of said stern cradle, a second keel roller disposed between said bow and stern cradles and spaced forwardly of said stern cradle, a tongue having a forward draft attachment end adapted for attachment to an automobile bumper and to be supported thereby at a substantially fixed elevation, said tongue having a rearward end portion underlying said frame, a pivotal connection between said frame and said rearward end portion of said tongue, said frame being tiltable on the axis of said road wheels from a normal transporting position into a rearwardly tilted unloading position with said bow cradle raised and said stern cradle lowered, said rear end portion of said tongue having a point thereon spaced from its said pivotal connection which swings in a predetermined path with respect to said frame upon such tilting of said frame when said forward end of said tongue is so supported, a second keel roller disposed between said respective bow and stern cradles, a supporting connection element for said second roller connecting between said roller and said point of said tongue adapted and arranged to raise said roller with respect to said frame upon such swinging of said point, and releasable means spaced from said pivotal connection connecting said frame and tongue releasably to retain said frame in said transporting position.

No references cited.

UNITED STATES PATENT OFFICE

CERTIFICATE OF CORRECTION

October 6, 1959

Patent No. 2,907,484

Alton N. Parker

It is hereby certified that error appears in the printed specification of the above numbered patent requiring correction and that the said Letters Patent should read as corrected below.

Column 8, lines 28 and 29, strike out "a second keel roller disposed between said respective bow and stern cradles,".

Signed and sealed this 21st day of June 1960.

(SEAL)
Attest:

KARL H. AXLINE
Attesting Officer

ROBERT C. WATSON
Commissioner of Patents